US009790104B2

(12) United States Patent
Anderson et al.

(10) Patent No.: US 9,790,104 B2
(45) Date of Patent: Oct. 17, 2017

(54) WATER TREATMENT

(71) Applicant: HYDRAFACT LIMITED, Edinburgh, Lothian (GB)

(72) Inventors: Ross Anderson, Blainslie (GB); Saeid Mazloum Vajari, Edinburgh (GB); Bahman Tohidi, Edinburgh (GB)

(73) Assignee: HYDRAFACT LIMITED, Edinburgh (GB)

(*) Notice: Subject to any disclaimer, the term of this patent is extended or adjusted under 35 U.S.C. 154(b) by 475 days.

(21) Appl. No.: 14/460,325

(22) Filed: Aug. 14, 2014

(65) Prior Publication Data
US 2015/0076065 A1    Mar. 19, 2015

Related U.S. Application Data

(63) Continuation-in-part of application No. PCT/GB2013/050371, filed on Feb. 15, 2013.

(30) Foreign Application Priority Data

Feb. 17, 2012   (GB) .................................. 1202743.9
Aug. 16, 2013   (GB) .................................. 1314731.9

(51) Int. Cl.
*B01D 17/02*    (2006.01)
*B01D 5/00*     (2006.01)
(Continued)

(52) U.S. Cl.
CPC ............ *C02F 1/26* (2013.01); *B01D 17/0214* (2013.01); *C02F 1/683* (2013.01); *C02F 5/10* (2013.01);
(Continued)

(58) Field of Classification Search
CPC .... C02F 1/68; C02F 1/683; C02F 5/00; C02F 5/10; C02F 1/26; C02F 2101/30;
(Continued)

(56) References Cited

U.S. PATENT DOCUMENTS 4,456,067 A * 6/1984 Pinner, Jr. ................ C09K 8/92
                                                166/279
5,648,575 A    7/1997 Klomp et al.
(Continued)

FOREIGN PATENT DOCUMENTS

EP    1232328    5/2003
GB    2427573    11/2007
(Continued)

OTHER PUBLICATIONS

Hussain et al., "Study of Kinetic Hydrate Inhibitor Removal Efficiency by Physical and Chemical Processes", Society of Petroleum Engineers, SPE 157146, May 14-16, 2012, pp. 1-4.
(Continued)

*Primary Examiner* — Joseph Drodge
(74) *Attorney, Agent, or Firm* — Liu & Liu

(57) ABSTRACT

The present invention relates to a method of treating aqueous fluid and apparatus therefor. The method comprises adding an organic compound to a mass of aqueous fluid comprising at least one Kinetic Hydrate Inhibitor (KHI). The organic compound comprises a hydrophobic tail and a hydrophilic head. The hydrophobic tail comprises at least one C—H bond and the hydrophilic head comprises at least one of: a hydroxyl (—OH) group; and a carboxyl (—COOH) group.

20 Claims, 4 Drawing Sheets

(51) Int. Cl.

| | | |
|---|---|---|
| *C02F 1/26* | (2006.01) | |
| *C02F 1/68* | (2006.01) | |
| *E21B 43/16* | (2006.01) | |
| *E21B 43/34* | (2006.01) | |
| *C07C 7/20* | (2006.01) | |
| *C02F 5/10* | (2006.01) | |
| *C02F 101/32* | (2006.01) | |
| *C02F 103/36* | (2006.01) | |
| *C02F 101/30* | (2006.01) | |
| *C02F 101/34* | (2006.01) | |
| *C02F 101/38* | (2006.01) | |

(52) U.S. Cl.
CPC .............. *E21B 43/16* (2013.01); *E21B 43/34* (2013.01); *C02F 2101/30* (2013.01); *C02F 2101/32* (2013.01); *C02F 2101/34* (2013.01); *C02F 2101/38* (2013.01); *C02F 2103/365* (2013.01); *C02F 2305/04* (2013.01)

(58) Field of Classification Search
CPC ............ C02F 2101/32; C02F 2101/322; C02F 2101/325; C02F 2101/34; C02F 2103/365; C02F 2305/04; C02F 2101/38; C07C 9/00; C07C 7/20; C09K 8/52; C09K 8/524; C09K 8/54; C09K 2208/22; B01D 17/02; B01D 17/0214; B01D 17/04; E21B 43/12; E21B 43/16; E21B 43/34; E21B 43/38; E21B 43/27; F17D 1/05; F17D 1/08; F17D 1/082
USPC ....... 166/305.1, 310; 507/90, 100, 102, 103, 507/200, 202, 203; 585/19, 899, 15
See application file for complete search history.

(56) References Cited

U.S. PATENT DOCUMENTS

| | | | | |
|---|---|---|---|---|
| 5,841,010 A | * | 11/1998 | Rabeony | C09K 8/52 585/15 |
| 5,877,361 A | * | 3/1999 | Rojey | E21B 43/40 585/15 |
| 6,080,704 A | * | 6/2000 | Halliday | C09K 8/035 166/305.1 |
| 6,242,518 B1 | * | 6/2001 | Bakeev | C07C 7/20 137/13 |
| 6,359,047 B1 | | 3/2002 | Thieu et al. | |
| 6,444,095 B1 | | 9/2002 | Evans et al. | |
| 6,451,802 B1 | * | 9/2002 | Janssen | C07D 405/14 514/254.02 |
| 7,033,504 B1 | * | 4/2006 | Blytas | B01D 17/047 166/267 |
| 2003/0092584 A1 | * | 5/2003 | Crews | C09K 8/685 507/200 |
| 2003/0220202 A1 | * | 11/2003 | Foxenberg | C09K 8/06 507/200 |
| 2008/0312478 A1 | | 12/2008 | Talley et al. | |
| 2009/0221451 A1 | * | 9/2009 | Talley | C09K 8/52 507/90 |
| 2010/0018712 A1 | | 1/2010 | Tian et al. | |
| 2010/0099807 A1 | | 4/2010 | Carlise et al. | |
| 2010/0113324 A1 | * | 5/2010 | Baldridge | C11D 3/384 510/493 |
| 2010/0144559 A1 | | 6/2010 | Rivers et al. | |
| 2011/0151576 A1 | * | 6/2011 | Perfect | G01N 21/643 436/172 |
| 2011/0240915 A1 | | 10/2011 | Tian et al. | |
| 2011/0284228 A1 | * | 11/2011 | Huang | C09K 8/602 166/308.1 |
| 2012/0270758 A1 | * | 10/2012 | Saini | C09K 8/035 507/119 |
| 2013/0213490 A1 | * | 8/2013 | Bhatnagar | E21B 37/06 137/13 |

FOREIGN PATENT DOCUMENTS

| | | | | |
|---|---|---|---|---|
| GB | 2467169 | * | 7/2010 | ............... C09K 8/58 |
| WO | 93/25798 | | 12/1993 | |
| WO | 01/38695 | | 5/2001 | |
| WO | 2011/123341 | | 10/2011 | |
| WO | 2012/135116 | | 10/2012 | |

OTHER PUBLICATIONS

Raja et al., "Waste Water Treatment Unit for LNG Mega Trains Challenges", Apr. 22-24, 2012, pp. 1-20.

Adham et al., "Kinetic Hydrate Inhibitor Removal by Physical, Chemical and Biological Processes", Offshore Technology Conference, OTC-24807-MS, www.onepetro.org/conference-paper/OTC-24807-MS, Mar. 25-28, 2014, pp. 1-11.

Allenson et al., Evaluation and Field Optimisation of Kinetic Hydrate Inhibitors for Application Within MEG Recovery Units, Gas Condensate Field, Mediterranean Sea, Society of Petroleum Engineers, SPE 127421, Feb. 14-17, 2010, pp. 1-10.

* cited by examiner

WATER TREATMENT

This application is a Continuation-In-Part of: (a) Great Britain Application No. 1314731.9, filed on Aug. 16, 2013; and (b) International Application No. PCT/GB2013/050371, filed on Feb. 15, 2013, which claims the priority of Great Britain Application No. 1202743.9, filed on Feb. 17, 2012.

FIELD OF THE INVENTION

The present invention relates to a method of treating aqueous fluid comprising a water miscible polymer and in particular but not exclusively to a method of treating aqueous fluid comprising a Kinetic Hydrate Inhibitor (KHI). The present invention further relates to aqueous fluid treatment apparatus which is configured to treat aqueous fluid comprising a water miscible polymer.

BACKGROUND TO THE INVENTION

Gas hydrates (or clathrate hydrates) are crystalline water-based solids which physically resemble ice and in which small non-polar molecules, partially polar molecules or polar molecules with large hydrophobic moieties, such as methane and carbon dioxide, are trapped inside cage-like structures of hydrogen bonded water molecules. The molecules trapped in the cage-like structures lend support to the lattice structure of the gas hydrate through van der Waals interactions; without such support the lattice structure is liable to collapse into a conventional ice crystal structure or liquid water. Gas hydrates typically form under elevated pressure and low temperature conditions. Such gas hydrate formation favouring conditions often arise in oil/gas pipelines and may result in agglomerations of clathrate crystals which are liable to obstruct the flow line, limit or stop production and/or damage equipment, such as pipelines, valves and instrumentation, and thereby pose significant economic and safety concerns. The formation of gas hydrates in oil and gas production operations therefore presents a significant economic problem and safety risk.

It is known to use Low Dosage Hydrate Inhibitors (LDHIs) to prevent gas hydrate caused flow line blocking and equipment fouling problems. There are two types of LDHIs: Kinetic Hydrate Inhibitors (KHIs); and Anti-Agglomerants (AAs). KHIs inhibit the nucleation and/or growth of gas hydrate crystals in produced water whereas AAs prevent the agglomeration of hydrate crystals into problematic plugs.

The active part of most commercially available KHI formulations is a synthetic polymer. The most commonly used synthetic polymer is a water miscible poly-n-vinylamide such as polyvinylcaprolactam (PVCap). The active polymer typically makes up less than half of a KHI formulation with the remainder being water miscible polymer solvent such as a low molecular weight alcohol, e.g. methanol, ethanol or propanol, a glycol, e.g. monoethylene glycol (MEG) or a glycol ether, e.g. ethylene glycol monobutyl ether (EGBE) or 2-butoxyethanol. Dispersion of the solid polymer in the liquid solvent provides for ease of distribution of the KHI, for example by pumping of the KHI through pipelines to the inhibitor injection points. Furthermore the solvent acts as a synergist by enhancing the hydrate formation inhibiting properties of the polymer. The polymer is by far the most expensive part of KHI formulations.

KHIs offer many advantages over traditional approaches to hydrate inhibition. Nevertheless there are a number of problems associated with the use of KHIs including the following specific examples. In view of the non-biodegradable nature of many KHI polymers the disposal of KHI containing reservoir produced water is normally a significant issue where there is no reinjection of the produced water into the reservoir, e.g. where reinjection is impossible. Where produced water is treated KHI polymers are liable to foul treatment apparatus, such as MEG or methanol regeneration units. Where there is reinjection of produced water high reservoir temperatures can give rise to KHI polymer precipitation which is liable to block well perforations and rock pores and thereby reduce injection efficiency.

The present invention has been devised in the light of the inventors' appreciation of problems associated with the use of KHIs, including the problems mentioned above. It is therefore an object for the present invention to provide a method of treating aqueous fluid comprising a water miscible polymer, such as at least one Kinetic Hydrate Inhibitor (KHI). It is a further object for the present invention to provide aqueous fluid treatment apparatus which is configured to treat aqueous fluid comprising a water miscible polymer, such as at least one Kinetic Hydrate Inhibitor (KHI).

STATEMENT OF INVENTION

According to a first aspect of the present invention there is provided a method of treating aqueous fluid, the method comprising adding an organic compound to a mass of aqueous fluid comprising at least one Kinetic Hydrate Inhibitor (KHI), the organic compound comprising a hydrophobic tail and a hydrophilic head, the hydrophobic tail comprising at least one C—H bond and the hydrophilic head comprising at least one of: a hydroxyl (—OH) group; and a carboxyl (—COOH) group.

In use the mass of aqueous fluid, which may be aqueous fluid present in an oil or gas production operation, is treated by addition of the organic compound. The organic compound may be added, for example, at an oil or gas production processing facility, such as a facility configured to handle produced water. The mass of aqueous fluid may therefore comprise aqueous liquid, such as produced water which may comprise at least one of formation and condensed water. The addition of the organic compound to the mass of aqueous fluid may cause separation of at least a part of the KHI from the aqueous fluid. More specifically the organic compound may cause separation from the aqueous fluid of a water miscible polymeric KHI, such as a water miscible synthetic polymer, comprised, for example, in a KHI formulation. The organic compound may be configured to have, at the most, limited solubility in water. The organic compound, e.g. pentanol or heptanoic acid, may have a miscibility with water (by mass) of less than 10%, 8%, 6%, 4%, 2%, 1%, 0.5%, 0.3%, 0.2%, 0.1% or 0.05%. Where an organic compound is of limited solubility in water less of the organic compound may be lost to the aqueous fluid. This means the aqueous fluid may be contaminated by the organic compound to a reduced extent. In addition an organic compound of limited solubility in water may be more liable to form a liquid phase apart from the aqueous fluid; as described below such phase separation may aid removal of the KHI. The aqueous fluid may be a substantially polar phase. The liquid phase comprising the organic compound may be a substantially non-polar phase and may be substantially non-aqueous.

The organic compound comprises a hydrophobic tail and a hydrophilic head, the hydrophobic tail comprising at least one C—H bond and the hydrophilic head comprising at least one of: a hydroxyl (—OH) group; and a carboxyl (—COOH) group. The hydrophilic head may comprise one and perhaps solely one of: a hydroxyl (—OH) group; and a carboxyl (—COOH) group.

The organic compound is understood to displace water dissolved KHI and thereby cause separation of the KHI from the aqueous fluid. More specifically at least a part of the KHI may transfer from the aqueous fluid to the organic compound. The structure of the organic compound, i.e. with regards to its C—H bond comprising hydrophobic tail and hydroxyl or carboxyl group comprising hydrophilic head, may be similar to the structure of the KHI. Thus the organic compound may interact with water in a similar fashion to the KHI such as to favour displacement of the KHI from the aqueous fluid to the organic compound. The organic compound, e.g. pentanol or heptanoic acid, may be operative to remove more than 80%, 85%, 90%, 91%, 92%, 93%, 94%, 95%, 96%, 97%, 98% or 99% of KHI, such as PVCap, present in aqueous fluid from the aqueous fluid.

The method may further comprise the step of removing at least a part of the KHI from the mass of aqueous fluid. The step of removing at least a part of the KHI may be carried out after the step of adding the organic compound to the mass of aqueous fluid. Where the KHI is comprised at least in part in a second liquid phase (i.e. a phase apart from the aqueous fluid), the removal step may comprise at least one of: gravity separation; liquid-liquid coalescing separation; and centrifugal separation. The removal step may therefore be a physical rather than chemical removal step involving physical separation of at least a part of the KHI from the aqueous fluid. On account of a difference in density between the first, aqueous phase and the second KHI comprising phase, the two phases can be expected to be readily separable from each other. The thus treated mass of aqueous fluid may now be used with the risk of adverse consequences arising from the presence of KHI being at least reduced. For example and where the mass of aqueous fluid is subject thereafter to known treatment approaches, such as MEG or methanol regeneration, such known treatment approaches can be followed with a reduced risk of KHI fouling the treatment apparatus. Where the mass of aqueous fluid is thereafter introduced to a geological formation, such as in the form of reinjection of produced water into a reservoir, removal of KHI reduces the risk of blockages occurring. Furthermore where the mass of aqueous fluid is thereafter disposed of, e.g. overboard, the risk of environmental damage arising from KHI is reduced.

Thereafter the removed KHI may be disposed of by known means, such as incineration. Disposal of the KHI after its removal from the mass of aqueous fluid may be more readily and cost effectively accomplished than disposal of a mass of aqueous fluid, such as produced water, comprising the KHI.

According to another approach the method may be used to determine the concentration of KHI in the mass of aqueous fluid. It may, for example, be important to know the concentration of KHI to ensure that KHI is being applied in an effective fashion or to ensure that KHI has been removed, e.g., from produced water ahead of disposal of the produced water. Furthermore accurate determination of KHI concentration may be required of laboratory tests. The method according to the invention may therefore further comprise determining a concentration of KHI in a mass of material, such as in a mass of the second, liquid phase. The step of determining the concentration of the KHI may therefore be carried out after the step of removing the KHI from the mass of aqueous fluid. Determining the concentration of KHI may be accomplished by a known method, such as analysis by InfraRed (IR) spectrometry, UltraViolet (UV) spectrometry or visual spectrometry. Alternatively the organic compound may be removed from the separate phase comprising the KHI, e.g. by heating the separate phase or perhaps heating the separate phase at reduced pressure, such in a partial vacuum, to drive off the organic compound and leave the KHI behind. The remaining KHI may then be weighed and the concentration of the KHI in the mass of aqueous fluid may be determined on the basis of material balance. Alternatively or in addition the method may comprise removing a small portion of the mass of aqueous fluid comprising the KHI and adding the organic component to the small portion. More specifically the method may further comprise removing the KHI from the small portion, e.g., by gravity or centrifugal separation. The step of determining the concentration of the KHI may be carried out after the step of removing the KHI from the small portion. Thus the analysis may be carried out on a sample of small volume taken from a large volume of aqueous fluid comprising the KHI. The concentration of KHI in the mass of aqueous fluid may be determined by inference based on the analysis of the small portion of aqueous fluid.

KHIs are normally present in low concentrations, such as less than 0.5 mass percent, in the like of reservoir produced water. Known approaches to determining the concentration of KHIs in such circumstances tend to be problematic. For example such known approaches are often complex, specific to one form of KHI and inaccurate at low concentrations, such as the concentration levels seen in produced water. The approach to concentration determination according to the present invention may be simpler, more accurate and more reliable than known approaches, in particular where the concentration levels are low. The approach according to the present invention may provide for concentration determination at lower levels of concentration, such as below 0.25 mass percent.

The organic compound may comprise a long hydrophobic tail and a short hydrophilic head. The organic compound may thus be of comparatively low miscibility with water on account of the presence of the short hydrophilic head and long hydrophobic tail. As mentioned above, the organic compound may have a structure such that its behaviour mimics the behaviour of the KHI to be displaced from the mass of aqueous fluid. The hydrophobic tail may comprise at least four, five or six carbon atoms with each carbon atom forming a C—H bond. The organic compound may comprise no more than one hydroxyl group. The organic compound may comprise no more than one carboxyl group. The hydroxyl or carboxyl group may be terminal to the organic compound.

In one form the organic compound may be an alcohol. The organic compound may therefore have the general formula R—OH, where R has the formula $C_nH_m$. More specifically the R group may comprise at least one of: an alkyl group (in the form of single bonded straight chain and branched isomers); an allyl group; a cyclic group (i.e. comprising cyclic single bonded carbon atoms); and a benzyl group. Higher molecular weight alcohols, such as butanol and higher, have been found to be effective at displacing KHI. Generally KHI displacement has been found to improve as the carbon number increases. A significant improvement in displacement has been observed with a carbon number of five and above. Furthermore an increase in carbon number may provide for a decrease in volatility and reduced solubility in the aqueous fluid; such properties are desirable for utility of the present invention. The carbon number of the alcohol may be at least four, five, six, seven or eight. Alternatively or in addition the carbon number of the alcohol may be no more than 12, 11 or 10. Alcohols with a carbon number of 6, 7 or 8 may have very low miscibility with water or be almost immiscible with water, e.g. less than about 2% miscibility by mass. In addition alcohols with a carbon number of 6, 7 or 8 may displace more than 90% of a KHI such as PVCap from the aqueous fluid. Alcohols with yet higher carbon numbers, e.g. with a carbon number of nine or more, may be used. However use of such higher carbon number alcohols may be less favoured when the alcohols are solid under standard conditions. The carbon number of the alcohol may therefore be no more than eleven, ten, nine or eight.

In another form the organic compound may be a carboxylic acid. The organic compound may therefore have the general formula R—COOH, where R is a monovalent functional group. More specifically the R group may comprise at least one of: an alkyl group (in the form of single bonded straight chain and branched isomers); an allyl group; a cyclic group (i.e. comprising cyclic single bonded carbon atoms); and a benzyl group. The organic compound may be a fatty acid and more specifically a saturated or an unsaturated fatty acid. Higher molecular weight carboxylic acids, such as pentanoic acid and higher, have been found to be effective at displacing KHI. Generally KHI displacement has been found to improve as the carbon number increases. A significant improvement in displacement has been observed with a carbon number of five and above. Furthermore an increase in carbon number may provide for a decrease in volatility and reduced solubility in the aqueous fluid; such properties are desirable for utility of the present invention. The carbon number of the carboxylic acid may be at least five, six, seven or eight. Alternatively or in addition the carbon number of the carboxylic acid may be no more than 13, 12, 11 or 10. Carboxylic acids with a carbon number of 5, 6, 7, 8, 9 or 10 may have very low miscibility with water or be almost immiscible with water, e.g. less than about 5% miscibility by mass. In addition carboxylic acids with a carbon number of 5, 6, 7, 8, 9 or 10 may displace more than 70% of a KHI such as PVCap from the aqueous fluid. Carboxylic acids with higher carbon numbers, e.g. with a carbon number of ten or more, may be used. However use of such higher carbon number carboxylic acids may be less favoured when the carboxylic acids are solid, such as under standard conditions. The carbon number of the carboxylic acid may therefore be no more than twelve, eleven, ten or nine.

In another form the organic compound may be a glycol ether. The organic compound may thus comprise: at least one pair of hydrocarbon groups bonded to each other by way of an oxygen atom; and one hydrocarbon group comprising a single hydroxyl (OH) group. The hydroxyl group may be terminal. A hydrocarbon group comprised in the glycol ether may be one of: an alkyl group; an allyl group; a cyclic group (i.e. comprising cyclic single bonded carbon atoms); a benzyl group; and a phenol group.

The method may further comprise adding a second organic compound to the mass of aqueous fluid, the second organic compound being of lower density than the first organic compound (i.e. the organic compound discussed hereinabove). Adding a second organic compound of lower density than the first organic compound may aid separation into two phases and with substantially no reduction in movement of KHI from the phase constituted by the mass of aqueous fluid to the phase constituted by the first organic compound. For example gravity separation into two separate phases may be quicker when the second organic compound is present. The second organic compound may be miscible with the first organic compound. After addition to the mass of aqueous fluid the first and second organic compounds may therefore together form a separate phase with thus formed phase being of lower density than a phase formed by the first organic compound alone. The second organic compound may be substantially hydrophobic. The KHI may be substantially immiscible in the second organic compound. The second organic compound may be a hydrocarbon. The second organic compound may have a carbon number no more than a carbon number of the first organic compound. A carbon number of the second organic compound may be greater than four and less than eleven. The second organic compound may comprise an alkane, such as heptane. The second organic compound may comprise a plurality, i.e. a mixture, of different organic compounds of the form presently described.

The density of the second organic compound may be at least substantially 0.5, 0.6 or 0.7 grams per millilitre. Alternatively or in addition the density of the second organic compound may be no more than substantially 0.9, 0.8 or 0.7 grams per millilitre. A density of the second organic compound between substantially 0.6 grams per millilitre and substantially 0.8 grams per millilitre has been found advantageous in certain circumstances such as where a density of the first organic compound is between substantially 0.8 grams per millilitre and substantially 0.9 grams per millilitre when it comprises a hydroxyl group. The density of the first organic compound may be at least substantially 0.7 or 0.8 grams per millilitre when it comprises a hydroxyl group. Alternatively or in addition the density of the first organic compound may be no more than substantially 1.0 or 0.9 grams per millilitre when it comprises a hydroxyl group. Alternatively a density of the second organic compound between substantially 0.6 grams per millilitre and substantially 0.8 grams per millilitre has been found advantageous in certain circumstances such as where a density of the first organic compound is between substantially 0.8 grams per millilitre and substantially 1.0 gram per millilitre when it comprises a carboxyl group. The density of the first organic compound may be at least substantially 0.8 or 0.9 grams per millilitre when it comprises a carboxyl group. Alternatively or in addition the density of the first organic compound may be no more than substantially 1.05 or 0.95 grams per millilitre when it comprises a carboxyl group.

The treatment fluid may comprise no more than substantially 99% volume, 95% volume, 90% volume, 85% volume, 80% volume, 75% volume, 70% volume, 60% volume, 50% volume, 40% volume, 30% volume, 20% volume, 10% volume, 5% volume or 1% volume of the second organic compound. The treatment fluid may comprise at least substantially 1% volume, 5% volume, 10% volume, 20% volume, 30% volume, 40% volume, 50% volume, 60% volume, 70% volume, 75% volume, 80% volume, 85% volume, 90% volume or 99% volume of the second organic compound. A treatment fluid comprising the first organic compound to at least substantially 20% volume and the second organic compound up to substantially 80% volume has been found under certain circumstances to provide for effective movement of KHI from the phase constituted by the mass of aqueous fluid to the phase constituted by the first organic compound. Concentrations of the first organic compound below substantially 20% volume have been found under certain circumstances to be less effective at moving KHI from the phase constituted by the mass of aqueous fluid. This may be because the KHI dissolves less readily in such a smaller volume of the first organic compound.

The second organic compound may be added to the mass of aqueous fluid at substantially a same time and perhaps along with the first organic compound. The first and second organic compounds may therefore be mixed and stored as a mixture before being added to the mass of aqueous fluid. Alternatively or in addition the second organic compound may be added following addition of the first organic compound and where the first organic compound either comprises the second organic compound or lacks the first organic compound. More specifically the second organic compound may be added to the phase constituted by the mass of aqueous fluid following separation into two phases after addition of the first organic compound. Furthermore the second organic compound may be added to the phase constituted by the mass of aqueous fluid after physical separation of the two phases as described elsewhere herein. The subsequent addition of the second organic compound may provide for removal of at least one of remaining KHI and remaining first organic compound, such as a cloudy micro-droplet suspension of KHI and the first organic compound. The method may further comprise a second removal step after addition of the second organic compound. Such a second removal step may comprise physical separation as described above with reference to the first removal step.

The mass of aqueous fluid before treatment may comprise a KHI formulation. A KHI formulation may comprise at least one KHI compound, such as a polymeric KHI and at least one further compound which enhances the performance or solubility of the KHI compound. The performance enhancing compounds may comprise at least one organic salt, such as a quaternary ammonium salt. Alternatively or in addition the KHI formulation may comprise a water miscible polymer solvent such as a low molecular weight alcohol, e.g. methanol, ethanol or propanol, a glycol, e.g. monoethylene glycol (MEG) or a glycol ether, e.g. ethylene glycol monobutyl ether (EGBE) or 2-butoxyethanol.

The at least one KHI may comprise a polymeric KHI. As will be familiar to the notionally skilled person a KHI prevents or at least limits the nucleation and/or growth of gas hydrate crystals. The at least one KHI may, typically, be water miscible. The at least one KHI may be organic. Alternatively or in addition the at least one KHI may comprise a compound selected from the group consisting of poly(vinylcaprolactam) (PVCap), polyvinylpyrrolidone, poly(vinylvalerolactam), poly(vinylazacyclooctanone), co-polymers of vinylpyrrolidone and vinylcaprolactam, poly(N-methyl-N-vinylacetamide), co-polymers of N-methyl-N-vinylacetamide and acryloyl piperidine, co-polymers of N-methyl-N-vinylacetamide and isopropyl methacrylamide, co-polymers of N-methyl-N-vinylacetamide and methacryloyl pyrrolidine, and combinations thereof. Alternatively or in addition the at least one KHI may comprise a compound selected from the group consisting of copolymers of acryloyl pyrrolidine and N-methyl-N-vinylacetamide, derivatives and mixtures thereof.

Alternatively or in addition the at least one KHI may comprise acrylamide/maleimide co-polymers such as dimethylacrylamide (DMAM) co-polymerized with, for example, maleimide (ME), ethyl maleimide (EME), propyl maleimide (PME), and butyl maleimide (BME). Alternatively or in addition the at least one KHI may comprise acrylamide/maleimide co-polymers such as DMAM/methyl maleimide (DMAM/MME), and DMAM/cyclohexyl maleimide (DMAM/CHME), N-vinyl amide/maleimide co-polymers such as N-methyl-N-vinylacetamide/ethyl maleimide (VIMA/EME), and lactam maleimide co-polymers such as vinylcaprolactam ethylmaleimide (VCap/EME). Alternatively or in addition the at least one KHI may comprise polymers such as polyvinyl alcohols and derivatives thereof, polyamines and derivatives thereof, polycaprolactams and derivatives thereof, polymers and co-polymers of maleimides, acrylamides and mixtures thereof.

The mass of aqueous fluid may further comprise at least one thermodynamic hydrate inhibitor (THI), such as MEG. Such a THI may be comprised in the mass of aqueous fluid further to the like of MEG used as a KHI polymer solvent. THIs and KHIs may both be employed to address the problem of gas hydrate formation. Depending on circumstances as much THI as produced water or perhaps even more THI may be used in oil production processes. The use of such significant volumes of THI imposes a considerable capital expenditure and operational expenditure burden with regards to both introduction of THI to the process and separation of THI from the produced oil. A comparatively small amount of KHI may provide for a significant reduction in the amount of a THI, such as MEG, required to provide a desired hydrate formation inhibition effect. For example it has been found that as little as 1% KHI can provide for a 20 to 40 weight percent reduction in MEG used. However and as mentioned above the use of KHI in addition to THI presents problems with regards to, for example, the adverse impact of the KHI on: the environment; processing equipment, such as MEG regeneration units; and downhole formations where there is reinjection of produced water. The present invention addresses such problems by removing KHI and may thereby provide for the use of KHI in combination with THI to reduce significantly the volume of THI used in oil or gas production processes.

The method according to the present invention may form part of an oil or gas production or exploration process. Therefore according to a second aspect of the present invention there is provided an oil or gas production or exploration method comprising the method according to the first aspect of the present invention.

More specifically the method may further comprise introducing at least one KHI to a conduit, such as a flow line comprised in an oil or gas production or exploration facility which is susceptible to gas hydrate formation. The at least one KHI may disperse in a mass of aqueous fluid, such as produced water, present in the oil or gas production or exploration facility. The method may further comprise introducing the organic compound at processing apparatus comprised in the oil or gas production or exploration facility. The processing apparatus may, for example, comprise a separator and the organic compound may be introduced upstream or preferably downstream of the separator.

The oil or gas production or exploration method may further comprise a KHI removal step as described with reference to the first aspect of the present invention. The KHI removal step may be performed by a separation process, which may be performed upstream of a regeneration process described further below. Oil or gas production or exploration facilities normally comprise a separator which is operative to separate well fluids into gaseous and liquid components. Two phase separators are often employed in gas recovery and three phase separators are often employed in oil recovery. More specifically the separator is normally operative to separate gaseous components and liquid components in gas recovery and to separate gaseous components, oil and water in oil recovery. The liquid component in two phase separation and the water component in three phase separation may comprise two phases, namely a first aqueous phase and a second liquid phase comprising the organic compound and the KHI. The KHI removal step may be performed in a primary separator, e.g. a two or three phase separator, configured to further separate the first and second liquid phases from each other. Alternatively or in addition the KHI removal step may be performed in a KHI separator operative downstream of the primary separator. Furthermore the organic compound may be introduced to the mass of aqueous fluid, e.g. the liquid component or water component, after primary separation.

The oil or gas production or exploration method may yet further comprise disposal of the first aqueous phase after the KHI removal step. Disposal might, for example, comprise dumping the first aqueous phase overboard. Alternatively or in addition the oil or gas production or exploration method may yet further comprise reinjection of the first aqueous phase after the KHI removal step. Disposal normally requires higher purity of the first aqueous phase than reinjection. In methods comprising such further steps KHI may be substantially the only hydrate inhibitor employed. In methods comprising the latter step, i.e. reinjection, the aqueous fluid may comprise condensed water and perhaps also formation water. Alternatively or in addition the first aqueous phase after separation from the second KHI comprising phase may be subject to a THI regeneration process where a THI has been introduced to the oil or gas production or exploration facility. After primary separation the THI is normally comprised in the liquid component in two phase separation and in the water component in three phase separation. After the KHI removal step the THI is normally comprised in the first aqueous phase. The oil or gas production or exploration facility may therefore comprise THI regeneration apparatus, such as a MEG regeneration unit, which is operative on the first aqueous phase. As will be familiar to the notionally skilled reader, THI regeneration apparatus is operative to transform rich, i.e. contaminated, THI to lean, i.e. clean, THI. Rich THI comprises water which is driven off by the regeneration apparatus heating the rich THI. The regeneration apparatus may further provide for removal of salt comprised in the rich THI. Salt laden THI is normally more problematic in oil production than gas production on account of the former involving recovery of salt laden produced water along with the oil. Rich THI may also comprise small amounts of hydrocarbons present on account of partial or incomplete separation. The regeneration apparatus may therefore further comprise hydrocarbon removal apparatus which is operative to remove hydrocarbons, e.g. in the form of vapour or liquid, from the rich THI. The hydrocarbon removal apparatus may be operative on rich THI before heating of the rich THI to drive off the water. The hydrocarbon removal apparatus may, for example, be a flash vessel. The oil or gas production or exploration method may therefore further comprise a THI regeneration process which is operative to transform used THI. In summary THI regeneration may be carried out with a reduced risk of fouling of regeneration apparatus on account of prior removal of KHI.

The aforegoing description is concerned primarily with oil or gas production. Nevertheless the present invention may also be applicable in exploration operations and in particular in well testing operations. The oil or gas production or exploration method may therefore comprise a well testing method. As will be familiar to the notionally skilled reader, well testing involves extracting hydrocarbon fluids from test wells to help determine the characteristics of a reservoir and thereby determine prospects for hydrocarbon recovery from the reservoir. Normally well testing facilities comprise a mobile two or three phase separator which is operative on produced well fluids. Water separated by the separator is normally disposed overboard because there is no or limited facility for reinjection, treatment or storage. A THI, which is typically methanol, is normally used to address hydrate formation. Environmental considerations impose limits on the amount of methanol that can be used. Likewise environmental considerations normally preclude or limit the use of KHIs. However the capability of the present invention to remove KHI provides for the use of KHI in combination with methanol to reduce significantly the volume of methanol used during well testing. The well testing method may therefore comprise the method of treating aqueous fluid and the step of removing KHI from the treated aqueous fluid as described above with reference to the first aspect of the present invention. More specifically the well testing method may comprise producing oil or gas from a test well, adding the organic compound to at least one of formation and condensed water from the test well and removing a second KHI comprising phase from a first aqueous phase after addition of the organic compound. The first aqueous phase may comprise THI, e.g. methanol, of a volume lower than that required had no KHI been present. The well testing method may further comprise disposing of the first aqueous phase, e.g. by disposal overboard.

Further embodiments of the second aspect of the present invention may comprise one or more features of the first aspect of the present invention.

According to a third aspect of the present invention there is provided apparatus for treating aqueous fluid, the apparatus comprising a vessel, such as a flow line comprised in an oil or gas production or exploration facility, containing a mass of aqueous fluid comprising at least one Kinetic Hydrate Inhibitor (KHI), and an arrangement configured to introduce an organic compound to the mass of aqueous fluid contained in the vessel, the organic compound comprising a hydrophobic tail and a hydrophilic head, the hydrophobic tail comprising at least one C—H bond and the hydrophilic head comprising at least one of: a hydroxyl (—OH) group; and a carboxyl (—COOH) group.

The apparatus for treating aqueous fluid may further comprise a separator, such as a two or three phase separator as described above. Alternatively or in addition the apparatus for treating aqueous fluid may further comprise THI regeneration apparatus as described above. Furthermore the THI regeneration apparatus may be configured to add the organic compound to the mass of aqueous fluid, e.g. to the liquid component from a two phase separator or to the water component from a three phase separator, before the aqueous fluid is subject to regeneration of THI, e.g. by heating to drive off water. THI regeneration apparatus may further comprise a KHI separator which is operative after addition of the organic compound to separate a first aqueous phase and a second liquid phase from each other, the second liquid phase comprising the organic compound and the KHI.

The apparatus may further comprise a second KHI separator which is operative after addition of a second organic compound of a form described elsewhere herein to separate a first aqueous phase and a second liquid phase from each other, the second liquid phase comprising the KHI. The second organic compound may therefore be operative to remove KHI remaining after a primary removal and separation process involving addition of the first organic compound with the second KHI separator providing for physical separation of the two phases formed following addition of the second organic compound.

Further embodiments of the third aspect of the present invention may comprise one or more features of the first or second aspect of the present invention.

According to a fourth aspect of the present invention there is provided THI regeneration apparatus comprising apparatus for treating aqueous fluid according to the third aspect of the present invention. Embodiments of the fourth aspect of the present invention may comprise one or more features of any previous aspect of the present invention.

According to a further aspect of the present invention there is provided a method of treating aqueous fluid, the method comprising adding an organic compound to a mass of aqueous fluid comprising a water miscible polymer, such as a water miscible synthetic polymer, the organic compound comprising a hydrophobic tail and a hydrophilic head, the hydrophobic tail comprising at least one C—H bond and the hydrophilic head comprising at least one of: a hydroxyl (—OH) group; and a carboxyl (—COOH) group. Embodiments of the further aspect of the present invention may comprise one or more features of any previous aspect of the present invention.

BRIEF DESCRIPTION OF DRAWINGS

The present invention will now be described by way of example only with reference to the following drawings, of which.

DESCRIPTION OF EMBODIMENTS

Figure 1:
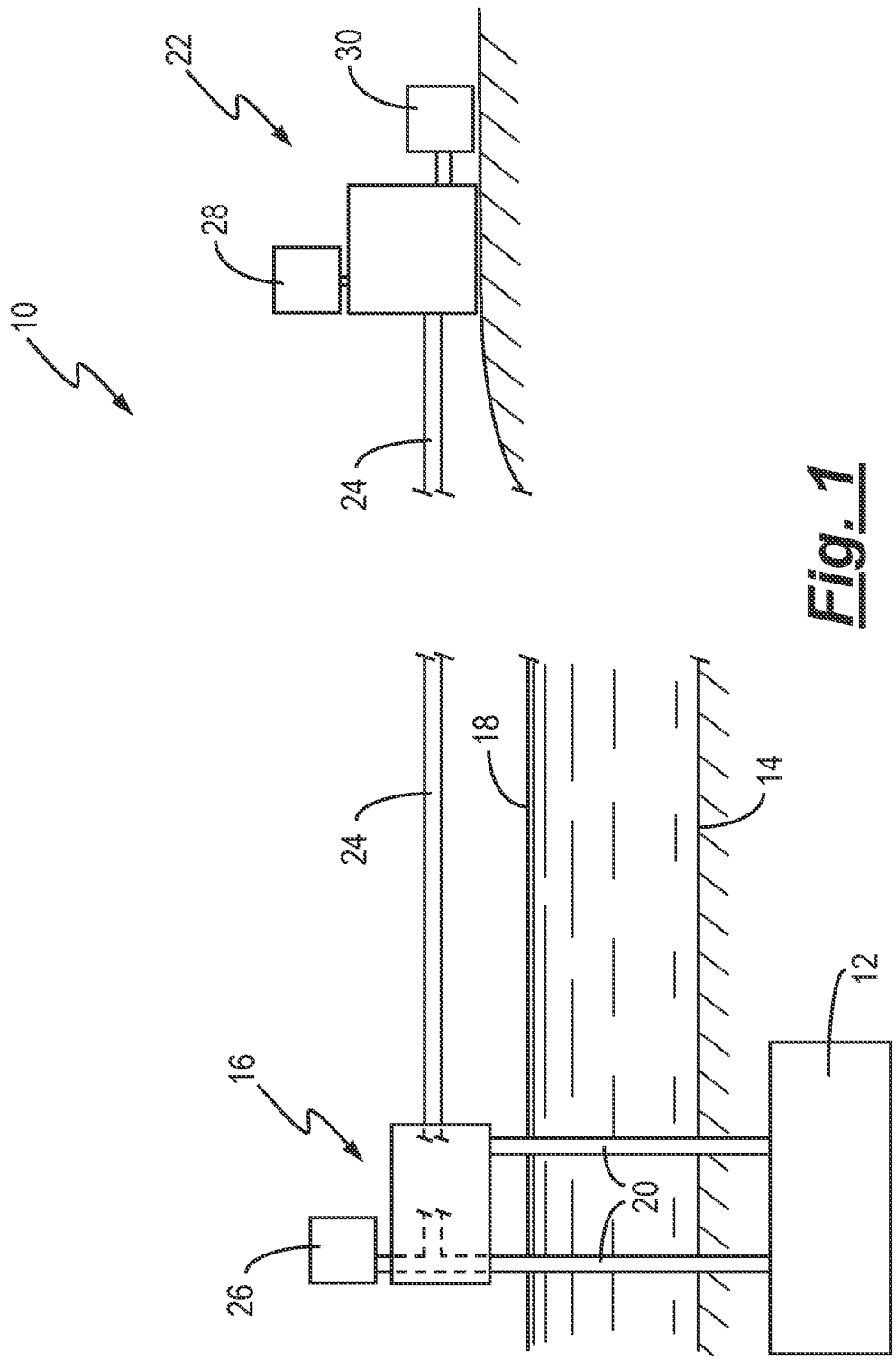
FIG. 1 shows an oil or gas production facility comprising apparatus according to the present invention.

An oil or gas production facility 10 is shown in FIG. 1. The oil or gas production facility 10 comprises a reservoir 12 containing reserves of oil and/or gas which is located below the seabed 14, an offshore platform 16 which is present above the sea surface 18 and well bores 20 which provide for fluid communication between the reservoir 12 and the platform 16. The oil or gas production facility 10 further comprises an onshore processing facility 22 which is in fluid communication with the platform 16 by way of a main pipeline 24. In practice the main pipeline is normally located on or in the seabed 14. However to provide for clarity of illustration the main pipeline 24 is shown above the sea surface 18. The oil or gas production facility 10 also comprises a KHI storage tank 26 on the offshore platform 16. The KHI storage tank 26 is in fluid communication with the platform end of the main pipeline 24 by way of a control valve and pumping apparatus. In addition the oil or gas production facility 10 comprises a treatment fluid storage tank 28, which is in fluid communication with the onshore processing facility 22, and a used KHI polymer storage tank 30, which is in fluid communication with the onshore processing facility 22.

A method according to a first embodiment of the present invention will now be described with reference to FIG. 1. A vendor delivers a KHI formulation to the operator of the oil or gas production facility 10. The KHI formulation is of known form. For example the KHI formulation comprises a water miscible polymer such as polyvinylcaprolactam (PVCap) and a water miscible polymer solvent such as a low molecular weight alcohol, a glycol or a glycol ether. The water miscible polymer makes up less than half of the KHI formulation with the remainder comprising the polymer solvent. The operator puts the KHI formulation in the KHI storage tank 26 on the offshore platform 16. The KHI formulation is introduced to the main pipeline 24 by way of operation of the control valve and pumping apparatus. Alternatively the KHI formulation is injected at the wellhead or downhole. The volume and rate of introduction of KHI formulation are determined in dependence on the extent of gas hydrate formation risk in the main pipeline and the onshore processing facility 22. A treatment fluid (which constitutes an organic compound) is stored in the treatment fluid storage tank 28. Further details of the treatment fluid are provided below. When treatment of produced water is required to remove KHI polymer present in produced water, treatment fluid is introduced from the treatment fluid storage tank 28 and added to a mass of produced water (which constitutes a mass of aqueous fluid) contained in the onshore processing facility 22. The treatment fluid forms a second, substantially non-polar phase apart from the first, substantially polar phase comprising the produced water and as it does the structure of the treatment fluid is such as to cause the transfer of the KHI polymer from the polar phase to the non-polar phase formed by the treatment fluid. The two phases separate from each other on account of their different densities. Then the second, substantially non-polar phase is removed from the first, substantially polar phase by gravity separation, liquid to liquid coalescing separation or centrifugal separation and stored in the used KHI polymer storage tank 30. The second phase contained in the used KHI polymer storage tank 30 is then disposed of, e.g. by incineration. The now treated produced water may then be used or further processed as described below with reference to FIG. 4.

The treatment fluid will now be described in more detail. In one form the treatment fluid is an alcohol having the general formula R—OH, where R has the formula $C_nH_m$. Higher molecular weight alcohols, such as butanol and higher and more particularly alcohols with a carbon number of five or more, have been found to be effective at displacing KHI polymer from produced water. This is because low molecular weight alcohols do not form a separate phase. Pentanol has a low degree of miscibility with water, i.e. about 2% by mass. Excess pentanol results in separation into a pentanol rich phase and a water rich phase. Furthermore excess pentanol results in KHI polymer displacement from the water rich phase to the pentanol phase. Pentanol has been found to displace more than 90% of PVCap in water. Generally KHI polymer displacement has been found to improve as the carbon number increases. Furthermore an increase in carbon number provides for an increase in miscibility with KHI polymers, a decrease in volatility and a decrease in its solubility in the aqueous phase which provide for improved performance. Octanol, which is almost immiscible with water at a solubility of substantially 30 mg of octanol per litre of water, has been found to completely displace KHI polymer from aqueous solution. Alcohols with yet higher carbon numbers can be used to displace KHI polymers. However alcohols with a carbon number of more than eleven are solid under standard conditions and therefore less readily usable. Tests have demonstrated that the presence of other water soluble organic compounds, such as MEG and ethanol, and inorganic salts, such as sodium chloride, have little or no appreciable effect on the displacement of KHI polymer from produced water.

Figure 2:
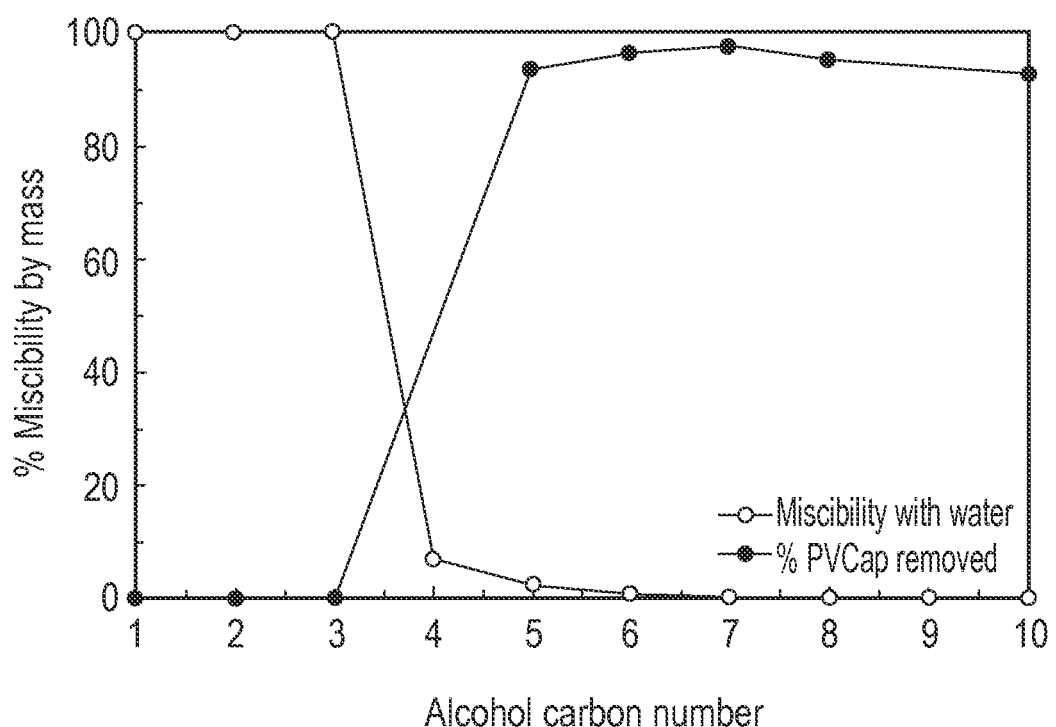
FIG. 2 is a graph showing plots of alcohol carbon number versus a) miscibility in water by mass and b) effectiveness of removal of PVCap from water.

A graph showing plots of alcohol carbon number versus a) miscibility in water by mass and b) effectiveness of removal of PVCap from water can be seen in FIG. 2. A first plot shows miscibility in water by mass with alcohols with a carbon number of three or less being completely or nearly completely miscible with water. The first plot shows the miscibility to drop to about 2% for pentanol and to drop yet further to about 0.5% for hexanol. A second plot shows the percentage of PVCap removed from water with an alcohol carbon number of three or less providing for minimal or no removal of PVCap. Higher alcohol carbon numbers provide for an increase in removal with a carbon number of 5, i.e. pentanol, providing for a significant improvement at over 90% removal of PVCap. Alcohols with a carbon number of six or seven demonstrate yet further improvement. Hexanol removes 0.5 wt % PVCap for at least 0.5 wt % of hexanol added.

In another form the treatment fluid is a glycol ether. Thus the treatment fluid comprises: at least one pair of hydrocarbon groups bonded to each other by way of an oxygen atom; and one hydrocarbon group comprising a single hydroxyl (OH) group. Example glycol ethers include: ethylene glycol monoethyl ether; ethylene glycol monopropyl ether; ethylene glycol monobutyl ether; ethylene glycol monophenyl ether; ethylene glycol monobenzyl ether; diethylene glycol monomethyl ether; diethylene glycol monoethyl ether; and diethylene glycol mono-n-butyl ether. Glycol ethers having a carbon number of at least six have been found to be effective at displacing KHI polymers. It is believed that a higher carbon number is required of glycol ethers than alcohols on account of the presence of the oxygen atom in the glycol ether between hydrocarbon groups which is operative to increase the miscibility of the hydrophobic tail of the glycol ether; a longer hydrophobic tail is therefore required to compensate for the increase in miscibility.

In another form the treatment fluid is a carboxylic acid having the general formula R—COOH, where R is a monovalent functional group. Higher molecular weight carboxylic acids, such as pentanoic acid and higher, i.e. carboxylic acids with a carbon number of five or more, have been found to be effective at displacing KHI polymer from produced water. This is because low molecular weight carboxylic acids do not form a separate phase. Pentanoic acid has a low degree of miscibility with water, i.e. about 5% by mass. Excess pentanoic acid results in separation into a pentanoic acid rich phase and a water rich phase. Furthermore excess pentanoic acid results in KHI polymer displacement from the water rich phase to the pentanoic acid phase. Pentanoic acid has been found to displace about 90% of PVCap in water. Generally KHI polymer displacement has been found to improve as the carbon number increases. Furthermore an increase in carbon number provides for an increase in miscibility with KHI polymers, a decrease in volatility and a decrease in its solubility in the aqueous phase which provide for improved performance. Octanoic acid, which is almost immiscible with water at a solubility of substantially 0.68 g of octanoic acid per litre of water, has been found to substantially displace KHI polymer from aqueous solution. Carboxylic acids with yet higher carbon numbers can be used to displace KHI polymers. However carboxylic acids with a carbon number of more than nine are solid under standard conditions and therefore less readily usable. Tests have demonstrated that the presence of other water soluble organic compounds, such as MEG and ethanol, and inorganic salts, such as sodium chloride, have little or no appreciable effect on the displacement of KHI polymer from produced water.

Figure 3:
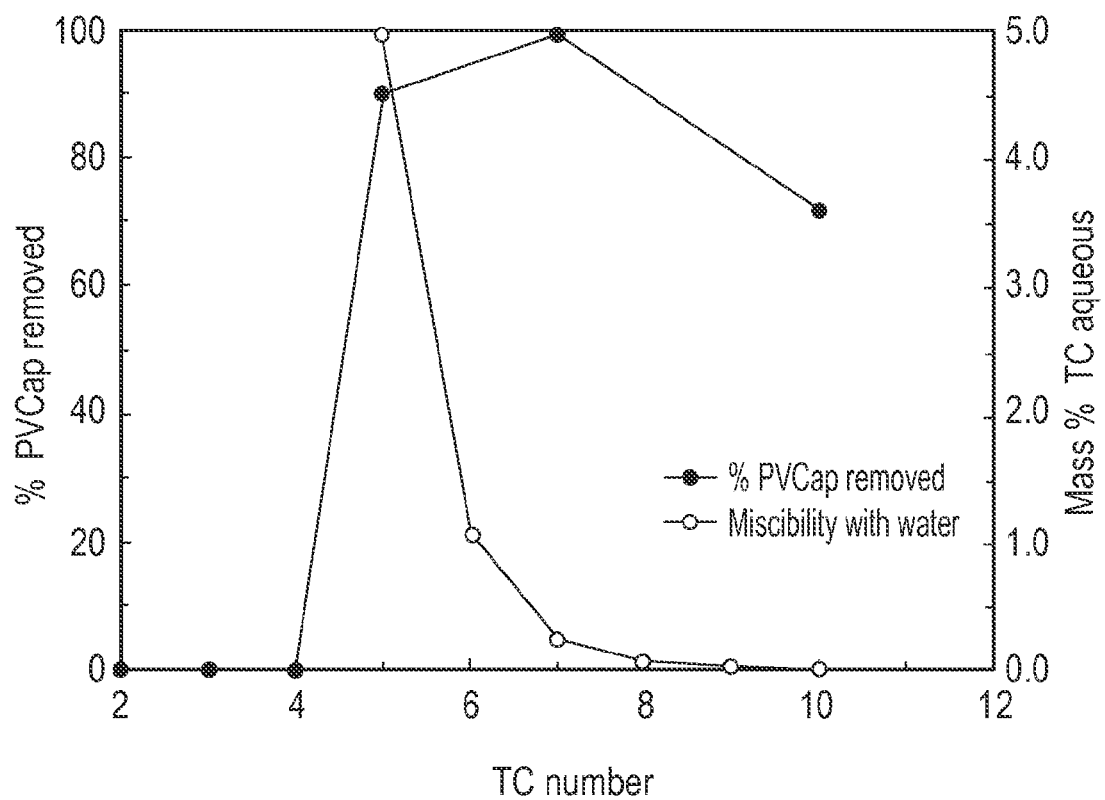
FIG. 3 is a graph showing plots of carboxylic acid carbon number versus a) miscibility in water by mass and b) effectiveness of removal of PVCap from water.

A graph showing plots of carboxylic acid carbon number versus a) miscibility in water by mass and b) effectiveness of removal of PVCap from water can be seen in FIG. 3. A first plot shows miscibility in water by mass with the miscibility dropping to about 5% for pentanoic acid and dropping yet further to about 0.25% for heptanoic acid. A second plot shows the percentage of PVCap removed from water with an carboxylic acid carbon number of four or less providing for minimal or no removal of PVCap. Higher carboxylic acid carbon numbers provide for an increase in removal with a carbon number of five, i.e. pentanoic acid, providing for a significant improvement at about 90% removal of PVCap. Carboxylic acids with a carbon number of six or seven demonstrate yet further improvement. Heptanoic removes more than 99% of PVCap.

According to yet another form the treatment fluid comprises a second organic compound of lower density than the first organic compound (i.e. the alcohol, glycol ether or carboxylic acid described above). In one approach and where the first organic compound is heptanol or heptanoic acid, the treatment fluid comprises a substantially equivalent volume of heptane. The presence of heptane in the treatment fluid has been found to aid separation into two phases and with substantially no reduction in movement of KHI from the phase constituted by the mass of aqueous fluid to the phase constituted by the first organic compound. Aiding separation by way of the second organic compound provides for ease of physical separation as described above with reference to FIG. 1 and which takes place in the KHI separator 44 which is described below with reference to FIG. 4. According to another approach the treatment fluid comprises 80% volume of heptane and 20% volume of heptanol. According to yet another approach the treatment fluid comprises no more than 50% volume of heptane with the balance being heptanoic acid. Movement of KHI from the phase constituted by the mass of aqueous has been found to be substantially unaffected by the reduction in the percentage volume of heptanol or heptanoic acid. Furthermore a second organic compound such as heptane is normally of lower cost than a first organic compound such as heptanol or heptanoic acid. Increasing the percentage volume of the second organic compound therefore provides a cost benefit. According to yet another approach the treatment fluid comprises plural second organic compounds, such as a mixture of hexane and heptane. The first and second organic compounds are mixed with each other and added together. Alternatively a further volume of the second organic compound is added after addition of the mixture of the first and second organic compounds and after physical separation of the two phases formed following addition of the mixture of the first and second organic compounds. The addition of the further volume of the second organic compound provides for removal of whatever KHI and first organic compound remains, e.g. in the form of a cloudy suspension. Alternatively the second organic compound is not mixed with the first organic compound with the first organic compound being added alone as part of a first KHI removal stage and the second organic compound being added subsequently as part of a second KHI removal stage. Subsequent addition of the second organic compound provides for removal of KHI and first organic compound remaining, for example, in the form of a cloudy suspension.

A method according to a second embodiment of the present invention will now be described with reference to FIG. 1. The second embodiment involves determining the concentration of KHI polymer in the produced water. The method according to the second embodiment is as follows.

A small sample, e.g. 1000 g, of produced water is removed at the onshore processing facility 22. Where the small sample of produced water contains about 0.1 mass percent of KHI polymer, the addition of 5.0 g of octanol or heptanoic acid to the sample displaces substantially all of the KHI polymer to an octanol or heptanoic acid rich phase and yields a KHI polymer concentrated octanol or heptanoic acid phase of substantially 17 hmass percent of KHI polymer. The concentration of KHI polymer in the octanol or heptanoic acid rich phase is then determined accurately by a known method, such as by InfraRed (IR) spectrometry, UltraViolet (UV) spectrometry or visual spectrometry. Alternatively the octanol or heptanoic acid is removed from the respective octanol or heptanoic acid rich phase, e.g. by heating the octanol or heptanoic acid rich phase to drive off the octanol or heptanoic acid, to leave the KHI polymer behind. The remaining KHI polymer is then weighed. The concentration of the KHI polymer in the octanol or heptanoic acid phase makes accurate determination of the mass fraction straightforward whereby the concentration of KHI polymer in the produced water is calculated readily on the basis of simple mass balance.

Figure 4:
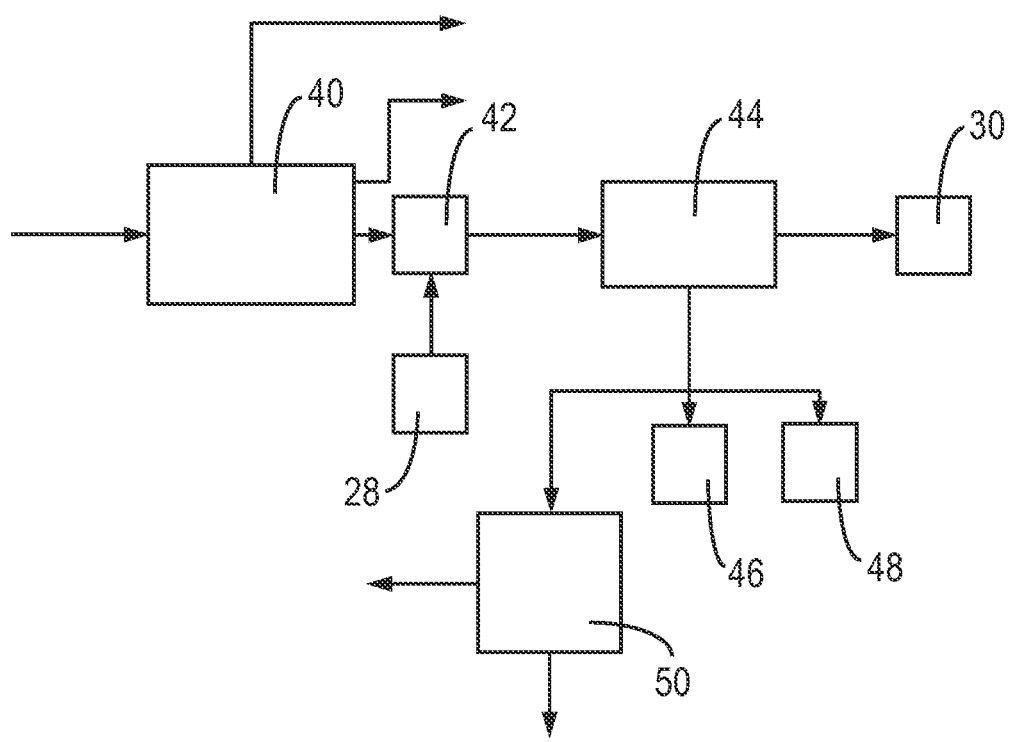
FIG. 4 shows a separator arrangement and a MEG regeneration unit comprised in apparatus according to the present invention.

An example separator arrangement and a MEG regeneration unit, which are comprised in apparatus according to the present invention, are shown in FIG. 4. In a first form the apparatus of FIG. 4 is comprised in the onshore processing facility 22 of FIG. 1. In a second form suited for a well testing process part of the apparatus of FIG. 4 is comprised in or adjacent the offshore platform 16.

Considering the first form of the apparatus of FIG. 4 further, FIG. 4 shows a conventional separator 40, which is either a two phase separator used in gas production or a three phase separator used in oil production. The two phase separator is operative to receive produced fluid and to separate the fluid into a gaseous component and a liquid component. The liquid component which comprises mainly condensed water is then received in a treatment fluid receiving chamber 42. The gaseous component is conveyed away from the separator 40 for further processing. The three phase separator is operative to receive produced fluid and to separate the fluid into a gaseous component, an oil component and a water comprising component. The gaseous component is either conveyed away from the separator 40 for flaring or subsequent processing and the oil component is conveyed away from the separator 40 for further processing. The water comprising component, which is normally salt laden on account of the produced water comprised in this component, is conveyed away from the separator 40 to the treatment fluid receiving chamber 42. Treatment chemical or fluid is introduced to the treatment fluid receiving chamber 42 from the treatment fluid storage tank 28 as described above with reference to FIG. 1. The contents of the treatment fluid receiving chamber 42 are then conveyed to a KHI separator 44. The KHI separator 44 is operative to remove the second, substantially non-polar phase, which comprises the KHI polymer, from the first, substantially polar aqueous phase. As described above with reference to FIG. 1, the KHI separator 44 is operative by one or more of gravity separation, liquid to liquid coalescing separation and centrifugal separation. Where gravity separation is used, the process can be assisted by introducing gas bubbles to lighten the hydrocarbon phase or by adjusting the temperature. Such separation techniques will be familiar to the person skilled in the art. The second, substantially non-polar phase is then conveyed from the KHI separator 44 to the used KHI polymer storage tank 30. The first, substantially polar aqueous phase is conveyed from the KHI separator 44 and then used or further processed depending on the application to hand. Where the process comprises the addition of a second organic compound subsequent to the addition of the first organic compound, the apparatus of FIG. 4 further comprises a second treatment fluid receiving chamber (not shown) immediately after and in fluid communication with the KHI separator 44 and which is fed from a second treatment fluid storage tank (not shown). In addition the apparatus of FIG. 4 further comprises a second KHI separator (not shown) immediately after and in fluid communication with the second treatment fluid receiving chamber. The second treatment fluid storage tank is filled with the second organic compound which is then fed therefrom into the second treatment fluid receiving chamber where it mixes with fluid received from the first KHI separator 44. Two phases are thus formed and are separated from each other in the second KHI separator, with the remaining KHI and first organic compound containing phase being conveyed to the used KHI polymer storage tank 30. The other phase, i.e. the now further treated first, substantially polar aqueous phase, is conveyed from the second KHI separator and then used or further processed depending on the application to hand. According to a first application the first, substantially polar aqueous phase is re-injected 46 into the reservoir formation. The first application is of particular utility where the aqueous fluid comprises condensed water and perhaps also formation water. According to a second application the first, substantially polar aqueous phase is disposed overboard 48. In a third application in which the first, substantially polar aqueous phase comprises THI and perhaps a significant proportion of THI, the first, substantially polar aqueous phase is conveyed from the KHI separator 44 to a THI regeneration unit 50. The THI regeneration unit 50 is operative in accordance with known practice to transform rich THI to lean THI by driving off water from the first, substantially polar aqueous phase. The lean THI is then re-used subject, if necessary, to further processing to remove hydrocarbons present. The driven off water is then either disposed of, e.g. overboard, or used for re-injection. Considering FIG. 4 yet further apparatus according to an embodiment of the present invention is constituted by the treatment fluid receiving chamber 42, the KHI separator 44 and the THI regeneration unit 50, which together constitute improved THI regeneration apparatus.

Considering the second form of the apparatus of FIG. 4 further, a mixture of KHI and THI (e.g., in the form of methanol) are introduced to well fluids present in a well testing process to reduce the likelihood of hydrate formation, with the KHI affording a reduction in the volume of methanol employed. After use the well fluids are conveyed to the separator 40 which is constituted as a mobile unit present on or adjacent the offshore platform 16. After separation the aqueous component is conveyed to the treatment fluid receiving chamber 42 and treated with treatment fluid as described above before being conveyed to the KHI separator 44 for removal of the first, substantially polar aqueous phase and second, substantially non-polar phase from each other. This second form of the apparatus lacks the THI regeneration unit 50 with the first, substantially polar aqueous phase, which comprises methanol albeit a reduced volume of methanol on account of the previously present KHI, being disposed of overboard 48 and the second, substantially non-polar phase, which comprises the KHI, being collected in the used KHI polymer storage tank 30. According to an alternative approach where operating conditions allow, inhibition is provided by way of KHI alone, i.e. no THI such as methanol is used. Otherwise the process is as described above with the KHI being separated following treatment with treatment fluid.

The invention claimed is:

1. A method of treating aqueous fluid, comprising:
adding an organic compound to a mass of aqueous fluid that had been provided with at least one Kinetic Hydrate Inhibitor (KHI), wherein the organic compound comprises a hydrophobic tail and a hydrophilic head, wherein the hydrophobic tail comprises at least one C—H bond, and wherein the hydrophilic head comprises at least one of: a hydroxyl (—OH) group and a carboxyl (—COOH) group, whereby at least a part of the KHI transfers from the mass of aqueous fluid to a separate phase formed by the organic compound; and
after the step of adding the organic compound to the mass of aqueous fluid, physically removing from the mass of aqueous fluid the separate phase formed by the organic compound and transferred KHI,
wherein the organic compound comprising at least one of:
an alcohol having the general formula R—OH, where R has the formula $C_nH_m$, the alcohol having a carbon number of at least 6 and no more than 12;
a glycol ether having a carbon number of at least 6 and no more than 9; and
a carboxylic acid having a carbon number of no less than 5 and no more than 9.

2. The method according to claim 1 in which the mass of aqueous fluid comprises at least one of formation water and condensed water.

3. The method according to claim 1 in which each of the hydroxyl group and the carboxyl group is terminal to the organic compound.

4. The method according to claim 1 in which the R group comprises at least one of: an alkyl group; an allyl group; a cyclic group; and a benzyl group.

5. The method according to claim 1 in which the alcohol has a carbon number of no less than 6 and no more than 8.

6. The method according to claim 1 in which a hydrocarbon group comprised in the glycol ether is one of: an alkyl group; an allyl group; a cyclic group; a benzyl group; and a phenol group.

7. The method according to claim 1 in which the mass of aqueous fluid further comprises a thermodynamic hydrate inhibitor before addition of the organic compound to the mass of aqueous fluid.

8. An oil or gas production process comprising the method according to claim 1, in which the at least one KHI is introduced to the mass of aqueous fluid when in a conduit comprised in an oil or gas production facility, the conduit being susceptible to gas hydrate formation; and the organic compound is added to the mass of aqueous fluid downstream of where the KHI is introduced to the mass of aqueous fluid at the oil or gas production facility.

9. The oil or gas production process according to claim 8 further comprising a primary separation step by way of a primary separator, the organic compound being added at least one of during the primary separation step and after the primary separation step.

10. The oil or gas production process according to claim 9 in which the physically removing step is performed in a KHI separator downstream of the primary separator.

11. The oil or gas production process according to claim 8 further comprising at least one of: disposal in the environment of the phase formed by the mass of aqueous fluid after the physically removing step; and reinjection into a geological subsurface formation of the phase formed by the mass of aqueous fluid after the physically removing step.

12. The oil or gas production process according to claim 8 in which the mass of aqueous fluid further comprises a thermodynamic hydrate inhibitor (THI) before addition of the organic compound to the mass of aqueous fluid, the process further comprising a thermodynamic hydrate inhibitor regeneration step which is operative to transform rich THI to lean THI, the THI regeneration step being operative on the mass of aqueous fluid after the physically removing step.

13. An oil or gas exploration process comprising a well testing process and the method of claim 1, in which the mass of aqueous fluid to which the organic compound is added is produced during well testing, the mass of aqueous fluid being disposed in the environment after the physically removing step.

14. The method according to claim 1 further comprising adding a second organic compound to the mass of aqueous fluid after addition of the first organic compound to the mass of aqueous fluid, the second organic compound being substantially hydrophobic and of lower density than the first organic compound.

15. The method according to claim 14 in which the second organic compound is miscible with the first organic compound whereby the first and second organic compounds together form a separate phase with the thus formed phase being of lower density than a phase formed by the first organic compound alone.

16. The method according to claim 14 in which the second organic compound is a hydrocarbon having a carbon number no higher than a carbon number of the first organic compound.

17. The method according to claim 14 in which the second organic compound is added to the phase constituted by the mass of aqueous fluid after the physically removing step.

18. The method according to claim 14 in which the second organic compound comprises an alkane.

19. The method according to claim 1 further comprising adding a second organic compound along with the first organic compound to the mass of aqueous fluid, the second organic compound being substantially hydrophobic and of lower density than the first organic compound.

20. The method according to claim 19 in which the first and second organic compounds are added to as a treatment fluid to the mass of aqueous fluid, the treatment fluid comprising in volume no less than 20% of the first organic compound.

* * * * *